(12) United States Patent
Kawamoto (10) Patent No.: US 7,809,944 B2
(45) Date of Patent: Oct. 5, 2010

(54) METHOD AND APPARATUS FOR PROVIDING INFORMATION FOR DECRYPTING CONTENT, AND PROGRAM EXECUTED ON INFORMATION PROCESSOR

(75) Inventor: Youji Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1051 days.

(21) Appl. No.: 10/134,599

(22) Filed: Apr. 30, 2002

(65) Prior Publication Data

US 2002/0166047 A1 Nov. 7, 2002

(30) Foreign Application Priority Data

May 2, 2001 (JP) ............................. 2001-134967

(51) Int. Cl.
*H04L 9/32* (2006.01)
(52) U.S. Cl. ...................... 713/168; 713/169; 713/182; 713/183; 705/50; 705/59; 380/270; 380/247
(58) Field of Classification Search ......... 713/168–169, 713/182, 193, 189; 705/57–59, 26, 50–52; 726/2, 4, 7, 26–29; 380/202, 247, 270, 278; 455/411, 412.1, 410; 709/217; 370/310
See application file for complete search history.

(56) References Cited

U.S. PATENT DOCUMENTS

| | | | | |
|---|---|---|---|---|
| 5,180,901 A * | 1/1993 | Hiramatsu | ................... | 235/380 |
| 5,926,624 A * | 7/1999 | Katz et al. | ................... | 709/217 |
| 6,052,788 A * | 4/2000 | Wesinger et al. | ............... | 726/11 |
| 6,085,323 A * | 7/2000 | Shimizu et al. | ............. | 713/150 |
| 6,199,055 B1 * | 3/2001 | Kara et al. | ................... | 705/405 |
| 6,240,517 B1 * | 5/2001 | Nishioka | ..................... | 726/20 |
| 6,398,245 B1 * | 6/2002 | Gruse et al. | ................. | 280/228 |
| 6,496,928 B1 * | 12/2002 | Deo et al. | ................... | 713/153 |
| 6,507,727 B1 * | 1/2003 | Henrick | ...................... | 455/3.06 |
| 6,574,609 B1 * | 6/2003 | Downs et al. | ................. | 705/50 |
| 6,697,944 B1 * | 2/2004 | Jones et al. | ................. | 713/168 |
| 6,779,115 B1 * | 8/2004 | Naim | .......................... | 713/192 |
| 6,792,280 B1 * | 9/2004 | Hori et al. | .................... | 455/517 |
| 6,816,596 B1 * | 11/2004 | Peinado et al. | .............. | 380/277 |
| 6,857,067 B2 * | 2/2005 | Edelman | ...................... | 713/155 |
| 6,871,236 B2 * | 3/2005 | Fishman et al. | ............. | 709/217 |
| 6,915,272 B1 * | 7/2005 | Zilliacus et al. | ............... | 705/26 |
| 6,928,545 B1 * | 8/2005 | Litai et al. | ................... | 713/185 |
| 6,950,804 B2 * | 9/2005 | Strietzel | ....................... | 705/26 |
| 6,988,250 B1 * | 1/2006 | Proudler et al. | ................. | 716/1 |
| 7,010,808 B1 * | 3/2006 | Leung et al. | ................... | 726/26 |
| 7,017,189 B1 * | 3/2006 | DeMello et al. | ............... | 726/26 |
| 7,395,438 B2 * | 7/2008 | Parks et al. | .................. | 713/194 |
| 2001/0017853 A1 * | 8/2001 | Kikuchi et al. | .............. | 370/335 |
| 2002/0013905 A1 * | 1/2002 | Hamada | ...................... | 713/185 |

(Continued)

FOREIGN PATENT DOCUMENTS

JP 7-123086 5/1995

(Continued)

*Primary Examiner*—Edan Orgad
*Assistant Examiner*—Yin-Chen Shaw
(74) *Attorney, Agent, or Firm*—Oblon, Spivak, McClelland, Maier & Neustadt, L.L.P.

(57) ABSTRACT

The authentication capability of a portable terminal connected to a playback device is used to perform user authentication, thereby providing content with a sufficient reliability while only requiring a simple mechanism.

20 Claims, 6 Drawing Sheets

U.S. PATENT DOCUMENTS

| | | | |
|---|---|---|---|
| 2002/0015497 A1* | 2/2002 | Maruyama et al. | 380/277 |
| 2002/0026424 A1* | 2/2002 | Akashi | 705/57 |
| 2002/0046181 A1* | 4/2002 | Story et al. | 705/59 |
| 2002/0107806 A1* | 8/2002 | Higashi et al. | 705/51 |
| 2002/0107809 A1* | 8/2002 | Biddle et al. | 705/59 |
| 2002/0138442 A1* | 9/2002 | Hori et al. | 705/59 |
| 2002/0146237 A1* | 10/2002 | Safadi | 386/94 |
| 2002/0180782 A1* | 12/2002 | Natsuno | 345/743 |
| 2003/0014315 A1* | 1/2003 | Jaalinoja et al. | 705/18 |
| 2004/0010467 A1* | 1/2004 | Hori et al. | 705/50 |

FOREIGN PATENT DOCUMENTS

| | | |
|---|---|---|
| JP | 9-319572 | 12/1997 |
| JP | 11-112494 | 4/1999 |
| JP | 11-331150 | 11/1999 |
| JP | 2000-285591 | 10/2000 |
| JP | 2001-500650 | 1/2001 |
| JP | 2001-44983 | 2/2001 |
| JP | 2001-51950 | 2/2001 |
| JP | 2001-236728 | 8/2001 |

* cited by examiner

METHOD AND APPARATUS FOR PROVIDING INFORMATION FOR DECRYPTING CONTENT, AND PROGRAM EXECUTED ON INFORMATION PROCESSOR

BACKGROUND OF THE INVENTION

1. Field of the Invention

The present invention relates to an apparatus and a method for providing information for decrypting content, and a program executed on an information processor, which are suitable for providing, for example, music content to a user. According to the present invention, the authentication capability of a portable terminal connected to a playback device is used to perform user authentication, thereby providing content with a sufficient reliability while only requiring a simple mechanism.

2. Description of the Related Art

In the art of providing a variety of content such as video, it is usual before providing the content to determine by performing user authentication whether or not a user who desires to obtain the content is an authorized user.

Figure 7:
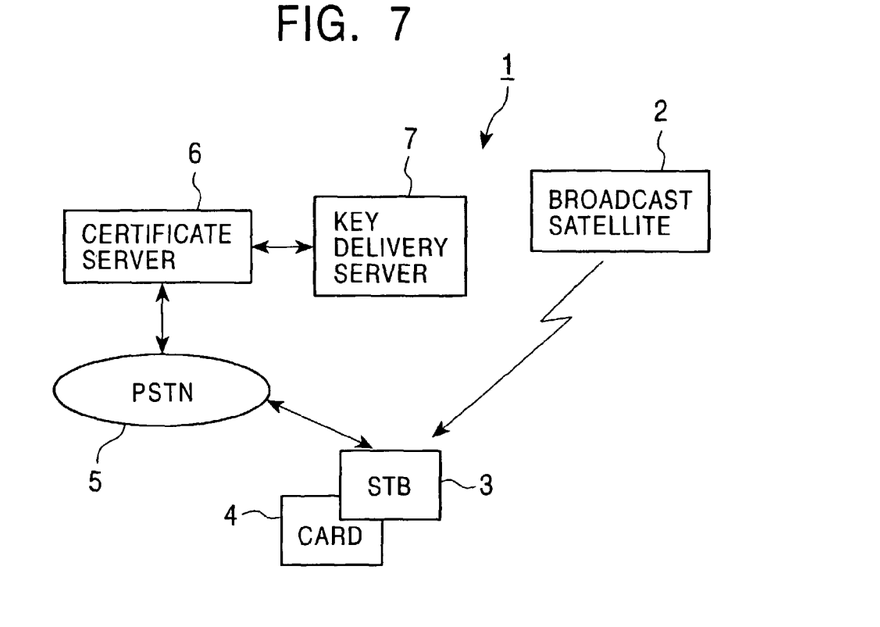
FIG. 7 is a block diagram of a satellite broadcasting system.

FIG. 7 is a block diagram of this type of content providing system, known as a satellite broadcasting system 1. In the satellite broadcasting system 1, satellite broadcast waves transmitted from a broadcast satellite 2 are received by a set-top box (STB) 3 to obtain video content.

The satellite broadcasting system 1 encrypts the content transmitted by the broadcast satellite 2 using a predetermined encryption key, and transmits the encrypted content, while modifying the encryption key at a predetermined timing. In the satellite broadcasting system 1, a card 4 having predetermined data recorded thereon is submitted to a user under a subscription contract. The card 4 is inserted in the set-top box 3 to access a certificate server 6 via a public line 5 such as a telephone line, so that the data recorded on the card 4 is transmitted to/from the certificate server 6 to authenticate the user. The set-top box 3 further receives a decryption key for a subscription program from a key delivery server 7 as a result of the user authentication, and uses the decryption key to decrypt the content. Therefore, the satellite broadcasting system 1 allows only authorized subscribers to utilize subscription content.

Figure 8:
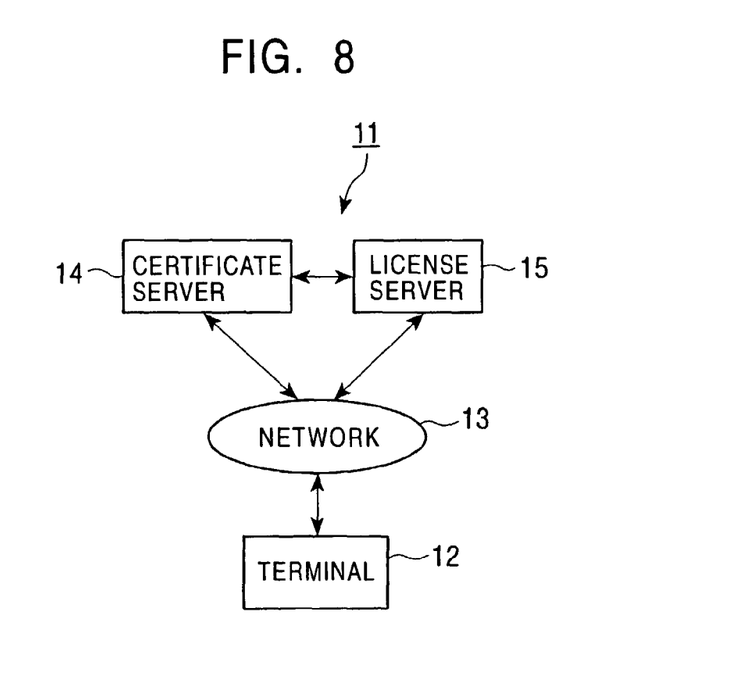
FIG. 8 is a block diagram of a personal identification system.

FIG. 8 is a block diagram of another type of personal identification system 11. In the personal identification system 11, a terminal device 12 accepts an ID, a password, a fingerprint, or the like, which is entered by a user, and transmits such information to a certificate server 14 over a network 13. The personal identification system 11 allows for personal identification at the certificate server 14, and allows for various services from a license server 15 as a result of identification. The personal identification system 11 may sometimes combine the certificate server 14 with the license server 15.

The satellite broadcasting system 1 requires a special structure necessary to authenticate the card, thereby increasing the complexity of the overall system. The satellite broadcasting system 1 further requires the certificate server 6 and the key delivery server 7 to authenticate a user and issue a key, thereby further increasing the complexity of the system configuration.

On the other hand, the personal identification system 11 described with reference to FIG. 8 requires a tamper-resistant mechanism because the terminal device 12 must obtain personal information necessary for verifying IDs, passwords, or the like, thereby increasing the complexity of the system configuration. Since the personal information is retained in the terminal device 12, it is necessary to provide a mechanism for preventing illegal use of the personal information, thereby increasing the complexity of the system configuration.

SUMMARY OF THE INVENTION

Accordingly, it is an object of the present invention to provide an apparatus and a method for providing information for decrypting content, which are capable of providing content with a sufficient reliability while only requiring a simple structure, and a program executed on an information processor.

To this end, in one aspect of the present invention, a method of providing information for decrypting content includes: a connecting step of connecting to a portable terminal so as to communicate data to and from a playback device containing encrypted content; an authenticating step of authenticating the portable terminal; and a providing step of providing information necessary for decrypting the content in the playback device to the portable terminal according to the result of the authenticating step.

In another aspect of the present invention, an the for providing information for decrypting content includes: a connecting unit for connecting to a portable terminal so as to communicate data to and from a playback device containing encrypted content; an authenticating unit for authenticating the portable terminal; and a providing unit for providing information necessary for decrypting the content in the playback device to the portable terminal according to the result of said authenticating means.

In still another aspect of the present invention, a program causes an information processing system to execute a method of providing information for decrypting content, the method including: a connecting step of connecting to a portable terminal so as to communicate data to and from a playback device containing encrypted content; an authenticating step of authenticating the portable terminal; and a providing step of providing information necessary for decrypting the content in the playback device to the portable terminal according to the result of the authenticating step.

In still another aspect of the present invention, a method of providing information for decrypting content includes: a first connecting step of connecting to a playback device containing encrypted content; a first authenticating step of authenticating the playback device; a first receiving step of receiving, from the playback device, information for identifying the content to be decrypted; a second connecting step of connecting to a providing device for providing information for decrypting the content; a second authenticating step of authenticating the providing device; a second receiving step of receiving, from the providing device, information necessary for decrypting the content in the playback device according to the result of the second authenticating step; and a providing step of providing information necessary for decrypting the content to the playback device according to the information received by the providing device.

In still another aspect of the present invention, an apparatus for providing information for decrypting content includes: a connector for connecting to a playback device containing encrypted content and to a providing device for providing information for decrypting the content; an authenticator for authenticating the playback device, and for authenticating the providing device; and a controller for receiving, from the playback device, information for identifying the content to be decrypted, for receiving, from the providing device, information necessary for decrypting the content in the playback device, and for providing information necessary for decrypting the content to the playback device according to the information received by the providing device.

In still another aspect of the present invention, a program causes a portable terminal to execute a method of providing information for decrypting content, the method including: a first connecting step of connecting to a playback device containing encrypted content; a first authenticating step of authenticating the playback device; a first receiving step of receiving, from the playback device, information for identifying the content to be decrypted from the playback device; a second connecting step of connecting to a providing device for providing information for decrypting the content; a second authenticating step of authenticating the providing device; a second receiving step of receiving, from the providing device, information necessary for decrypting the content in the playback device according to the result of the second authenticating step; and a providing step of providing information necessary for decrypting the content to the playback device according to the information received by the providing device.

In still another aspect of the present invention, a method of providing information for decrypting content includes: a first connecting step of connecting to a playback device containing encrypted content; a first receiving step of receiving, from the playback device, information for identifying the content to be decrypted; a determining step of determining whether or not information necessary for decrypting the content is self-contained according to the information for identifying the content; a first providing step for, if the information necessary for decrypting the content is self-contained, providing information for decrypting the content to the playback device according to the self-contained information; a second connecting step of connecting to a providing device for providing information for decrypting the content if the information for decrypting the content is not self-contained; a second receiving step of receiving, from the providing device, information necessary for decrypting the content in the playback device; and a second providing step of providing information necessary for decrypting the content to the playback device according to the information received from the providing device.

In still another aspect of the present invention, an apparatus for providing information for decrypting content includes: a connector for connecting to a playback device containing encrypted content and to a providing device for providing information for decrypting the content; and a controller for receiving, from the playback device, information for identifying the content to be decrypted; for determining whether or not information necessary for decrypting the content is self-contained according to the information for identifying the content; for, if the information necessary for decrypting the content is self-contained, providing information for decrypting the content to the playback device according to the self-contained information; for, if the information necessary for decrypting the content is not self-contained, receiving, from the providing device, information necessary for decrypting the content in the playback device; and for providing information necessary for decrypting the content to the playback device according to the information received from the providing device.

In still another aspect of the present invention, a program causes a portable terminal to execute a method of providing information for decrypting content, the method including: a first connecting step of connecting to a playback device containing encrypted content; a first receiving step of receiving, from the playback device, information for identifying the content to be decrypted; a determining step of determining whether or not information necessary for decrypting the content is self-contained according to the information for identifying the content; a first providing step for, if the information necessary for decrypting the content is self-contained, providing information for decrypting the content to the playback device according to the self-contained information; a second connecting step of connecting to a providing device for providing information for decrypting the content if the information for decrypting the content is not self-contained; a second receiving step of receiving, from the providing device, information necessary for decrypting the content in the playback device; and a second providing step of providing information necessary for decrypting the content to the playback device according to the information received from the providing device.

In still another aspect of the present invention, a method of providing information for decrypting content includes: a first connecting step of connecting to a playback device containing encrypted content so as to communicate data to and from a user's portable terminal; an obtaining step of obtaining, from the playback device, information for identifying the portable terminal; a second connecting step of connecting to the portable terminal according to the information for identifying the portable terminal; an authenticating step of authenticating the portable device; and a providing step of providing information necessary for decrypting the content in the playback device to the portable terminal according to the result of the authenticating step.

In still another aspect of the present invention, an apparatus for providing information for decrypting content includes: a connector for connecting to a user's portable terminal and to a playback device containing encrypted content so as to communicate data to and from the portable terminal; an authenticator for authenticating the portable device; and a controller for obtaining, from the playback device, information for identifying the portable terminal; for accessing the portable terminal according to the information for identifying the portable terminal; and for providing information necessary for decrypting the content in the playback device to the portable terminal according to the result of the authenticator.

In still another aspect of the present invention, a program causes an information processing system to execute a method of providing information for decrypting content, the method including: a first connecting step of connecting to a playback device containing encrypted content so as to communicate data to and from a user's portable terminal; an obtaining step of obtaining, from the playback device, information for identifying the portable terminal; a second connecting step of connecting to the portable terminal according to the information for identifying the portable terminal; an authenticating step of authenticating the portable device; and a providing step of providing information necessary for decrypting the content in the playback device to the portable terminal according to the result of the authenticating step.

In still another aspect of the present invention, a method of using a portable terminal to provide information for decrypting content includes: a first connecting step of connecting to a playback device containing encrypted content; a sending step of sending information for identifying the portable terminal to the playback device; a second connecting step of, when accessed from a providing device for providing information for decrypting the content, connecting to the providing device according to the information for identifying the portable device which is sent to the playback device; an authenticating step of authenticating the providing device; a receiving step of receiving, from the providing device, information necessary for decrypting the content in the playback device according to the result of the authenticating step; and a providing step of providing information for decrypting the content to the playback device according to the information received from the providing device.

In still another aspect of the present invention, an apparatus for providing information for decrypting content includes: a connector for connecting to a playback device containing encrypted content, and to a providing device for providing information for decrypting the content; an authenticator for authenticating the providing device; and a controller for sending information for identifying the portable terminal to the playback device; when accessed from the providing device, connecting to the providing device according to the information for identifying the portable device which is sent to the playback device; for receiving, from the providing device, information necessary for decrypting the content in the playback device according to the result of the authenticator; and for providing information for decrypting the content to the playback device according to the information received from the providing device.

In still another aspect of the present invention, a program causes an information processing system to execute a method of providing information for decrypting content, the method including: a first connecting step of connecting to a playback device containing encrypted content; a sending step of sending information for identifying the portable terminal to the playback device; a second connecting step of, when accessed from a providing device for providing information for decrypting the content, connecting to the providing device according to the information for identifying the portable device which is sent to the playback device; an authenticating step of authenticating the providing device; a receiving step of receiving, from the providing device, information necessary for decrypting the content in the playback device according to the result of the authenticating step; and a providing step of providing information for decrypting the content to the playback device according to the information received from the providing device.

DESCRIPTION OF THE PREFERRED EMBODIMENTS

Some embodiments of the present invention are now described in detail with reference to the accompanying drawings.

First Embodiment (1) Construction

Figure 1:
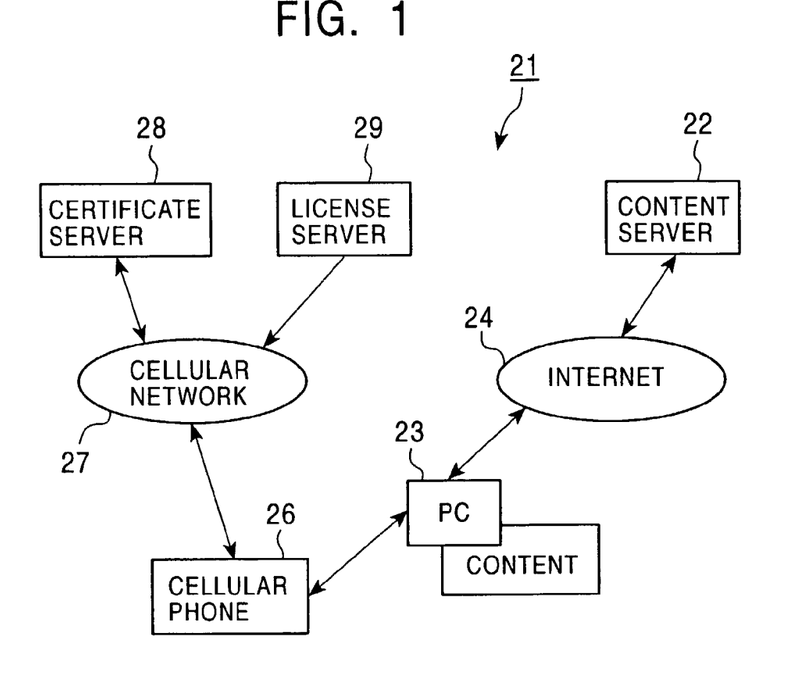
FIG. 1 is a block diagram of a content providing system according to a first embodiment of the present invention.

FIG. 1 is a block diagram of a content providing system 21 according to a first embodiment of the present invention.

In the content providing system 21, encrypted content is provided to a personal computer (PC) 23 from a content server 22 or a recording medium such as an optical disk. When the PC 23 accesses the content server 22 via the Internet 24, the content server 22 provides the encrypted content to the PC 23.

In the first embodiment, the provided content is decrypted using a predetermined content key. The content is provided together with an encrypted content key, and a license ID that is an identification code for identifying the content licensing. The content key is decrypted using a license key specified by the license ID.

The PC 23 records and maintains an application program which allows the content to be played back upon user's manipulation in a recording medium such as a hard disk or a semiconductor memory. When the application program is launched and is directed by a user to play back the desired content, the PC 23 obtains the content key and the license ID along with that content. After mutual authentication between the 23 and an external device connected to the PC 23, the PC 23 transmits the license ID and the content key to the external device to decode the content key. The PC 23 decrypts the user's desired content using the decoded content key, and presents the content to the user via output devices such as an internal speaker and a display device. The PC 23 directs the application program for playing back the content not to store a content key for decrypting the content in a storage, thereby protecting the content against illegal attacks.

The cellular telephone 26 may be a portable PHS (Personal Handyphone System) terminal, and is used, like a normal cellular telephone, to communicate with a desired party over a cellular network 27. The cellular telephone 26 is provided with an external USB (Universal Serial Bus) connection port, and is connected to the PC 23 through the external port to exchange data therebetween. The cellular telephone 26 connected to an external device is requested for a license key by the external device. Then, the cellular telephone 26 and the external device are mutually authenticated according to a predetermined authentication protocol, and a user of the cellular telephone 26 is authenticated, followed by a subsequent process in which a license key is provided according to the results of authentication.

Figure 2:
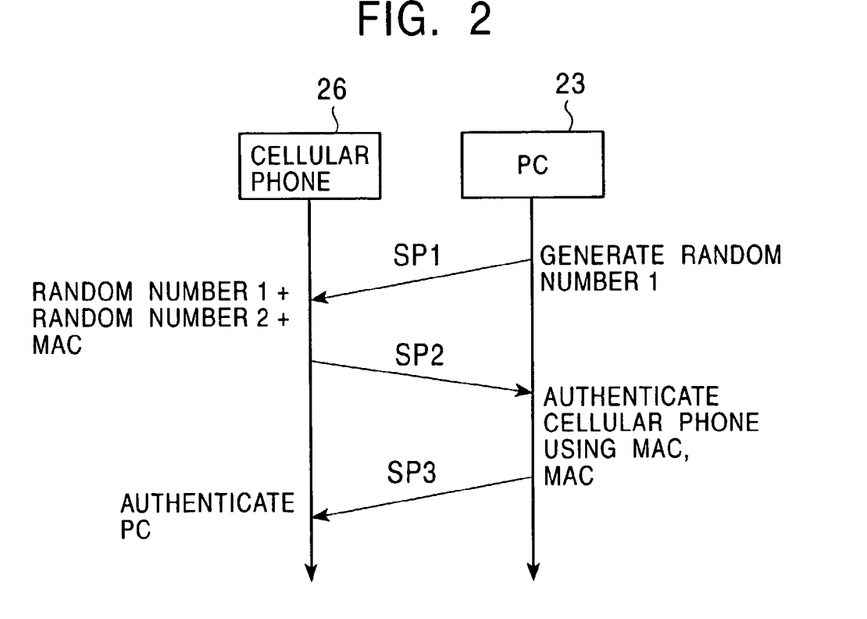
FIG. 2 is a time chart of a procedure for performing mutual authentication between a cellular telephone and a personal computer in the content providing system shown in FIG. 1.

FIG. 2 is a time chart showing an authentication protocol in the mutual authentication, showing mutual authentication using the three-way protocol in the first embodiment. Alternatively, PKI (public key infrastructure) may be used for mutual authentication. Specifically, when the cellular telephone 23 is connected to the PC 23, in step SP1, the cellular telephone 23 receives random number 1 from the PC 23. In step SP2, the cellular telephone 23 sends the PC 23 random number 2 that is generated by itself using the received random number 1, and data, such as an MAC (Media Access Control) address, for verifying the identity. Then, the cellular telephone 26 is authenticated by the PC 23 using the MAC address. In step SP3, the cellular telephone 26 receives the MAC address of the PC 23 which has been encrypted using the random number 2, and authenticates the PC 23.

After mutual authentication, the cellular telephone 26 receives a password entered by a user, and verifies the password with a password that has been preset by the user to authenticate the user. In the first embodiment, the password is designated using a four-digit number.

According to the first embodiment, therefore, the cellular telephone 26 can be used to perform user authentication, thus preventing user's personal information from being passed to the other units such as the PC 23. The configuration of the PC 23 can be therefore simplified. Furthermore, the cellular telephone 26 can be used to perform user authentication, thereby making effective use of the existing infrastructure in order to prevent a third party from illegally accessing the content using, for example, a stolen cellular telephone. After user authentication has completed, the cellular telephone 26 decrypts the content key, and informs the PC 23 of this.

Figure 3:
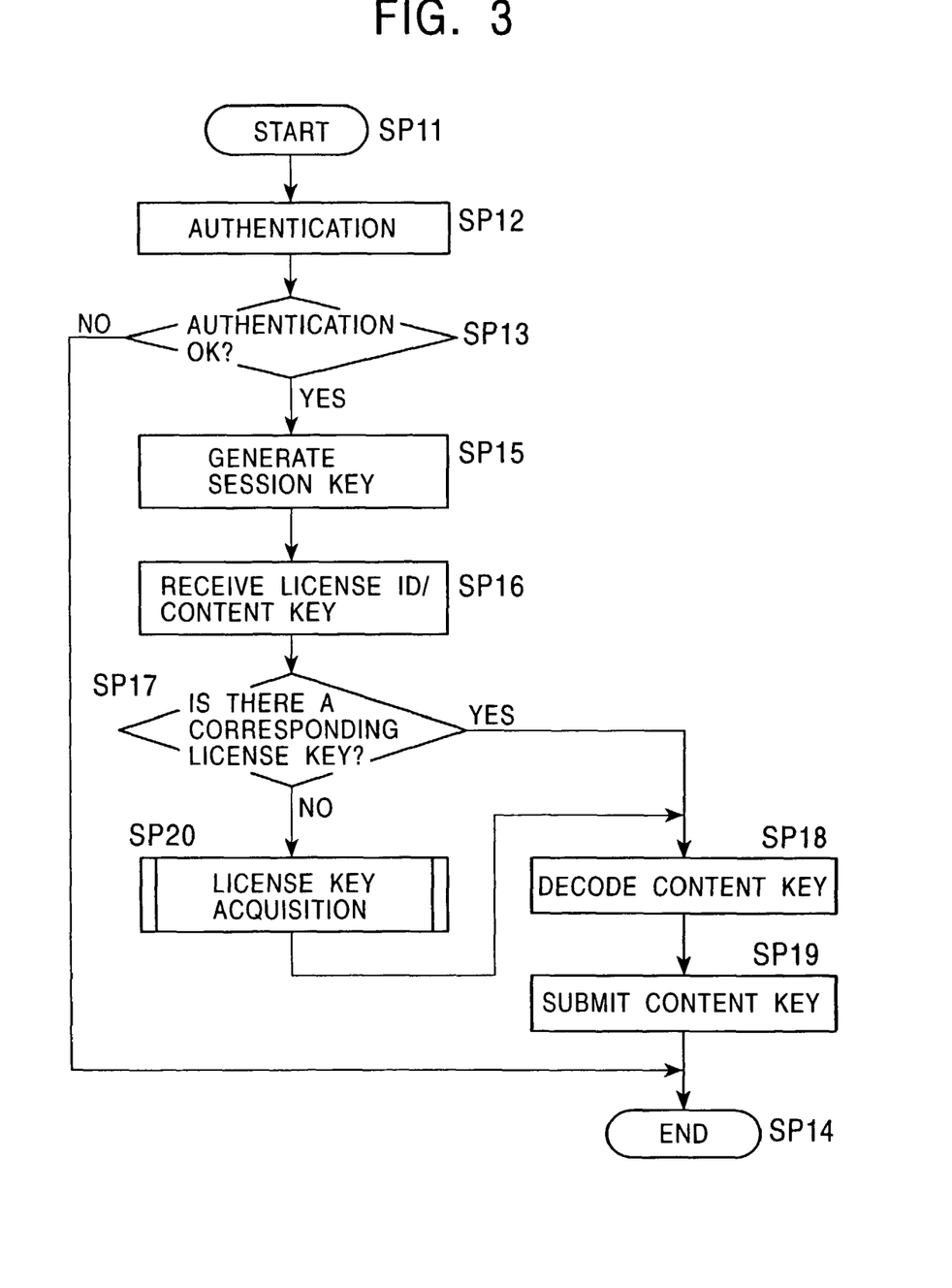
FIG. 3 is a flowchart showing the procedure in the cellular telephone.

FIG. 3 is a flowchart showing the procedure in the cellular telephone 26. The procedure is implemented by executing, on a processor such as a CPU (central processing unit), a program stored in a recording medium such as a memory within the cellular telephone 26. The procedure may also be implemented on a hardware circuit.

Upon a request from an external device such as the PC 23, the cellular telephone 26 starts processing in step SP11, followed by step SP12, in which the above-described series of authentications is performed. In step SP13, it is determined by the cellular telephone 26 whether or not the authentications are successfully performed. If the negative decision is obtained, the cellular telephone 26 terminates the procedure in step SP14.

If the affirmative decision is obtained in step SP13, then, in step SP15, a session key is generated in order to exchange encrypted data between the cellular telephone 26 and the PC 23. The session key is used to encrypt data, which is exchanged between cellular telephone 26 and the PC 23.

After generating the session key, in step SP16, the cellular telephone 26 receives a license ID and a content key from the PC 23. In step SP17, it is determined whether or not a license key corresponding to the license ID is stored in an internal memory. If the affirmative decision is obtained, the cellular telephone 26 decrypts the content key using the stored license key in step SP18. In step SP19, the cellular telephone 26 submits the decrypted content key to the PC 23, and terminates the procedure in step SP14.

If the corresponding license key is not maintained, i.e., if the negative decision is obtained in step SP17, the cellular telephone 26 obtains the corresponding license key by performing a licensing process using a certificate server 28 and a license server 29, as described below, in step SP20, followed by step SP18.

The content providing system 21 allows the PC 23 serving as a content playback apparatus to collect content without any limitation, and allows the content to be played back only by a specific licensed user, thereby protecting the copyright of the content. A user who is permitted for playback of the content is verified using a cellular telephone as a personal terminal carried with the user, thereby making effective use of the existing infrastructure to simplify the system configuration.

Figure 4:
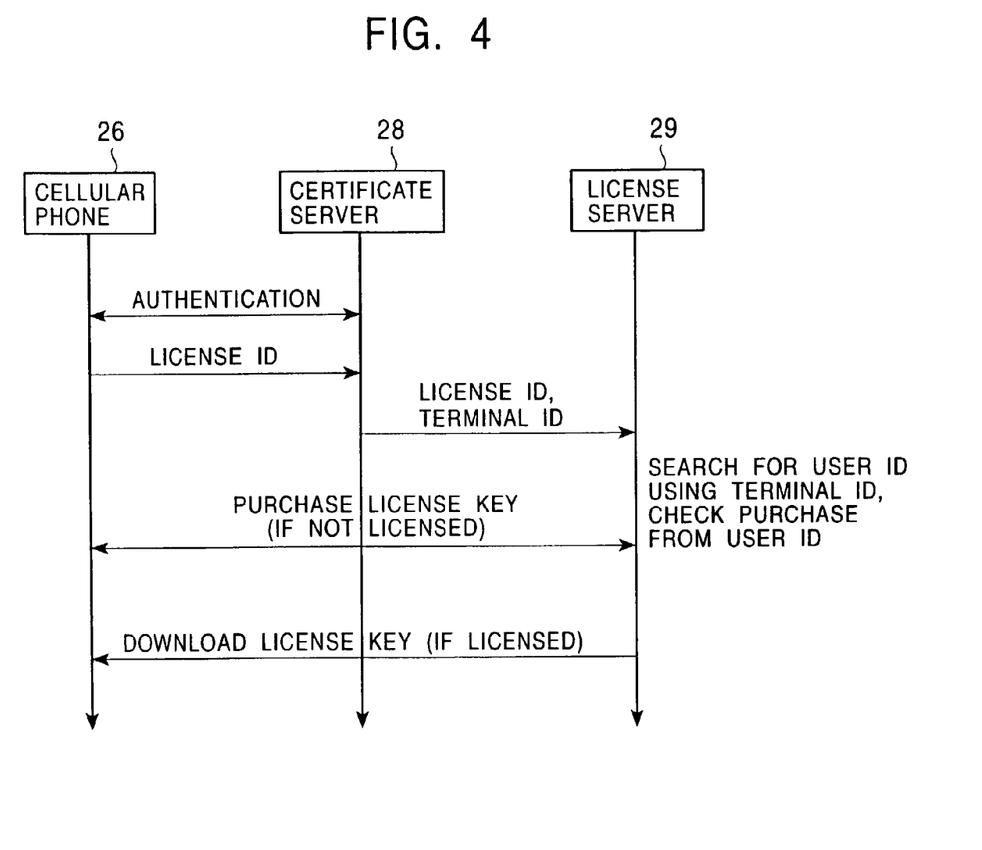
FIG. 4 is a time chart of a procedure for issuing a license key in the content providing system shown in FIG. 1.

FIG. 4 is a time chart showing a licensing process in the cellular telephone 26. The cellular telephone 26 accesses the certificate server 28 to perform authentication between the cellular telephone 26 and the certificate server 28. The certificate server 28 is a server capable of authenticating the cellular telephone 26. In the first embodiment, the certificate server 28 is implemented as a server which manages telephone calls from the cellular telephone 26 over the cellular network 27 to perform processing such as billing. Therefore, the content providing system 21 can make effective use of the existing infrastructure, thereby simplifying the system configuration.

After authentication has been performed, the cellular telephone 26 sends a license ID, and a terminal ID for identifying the cellular telephone 26 to the license server 29 via the certificate server 28. The license server 29 uses the license ID and the terminal ID to determine whether or not the user is licensed. The license server 29 is a server for managing the content provided in the content providing system 21, and manages each user's licensing for content based on a terminal ID.

If a user is licensed for the content specified by the license ID (the content which is to be played back on the PC 23), the license server 29 detects the licensing. As the result of detection, the cellular telephone 26 downloads a license key from the license server 29.

If a user is not licensed, various menus provided from the license server 29 are displayed on an internal display panel of the cellular telephone 26, or displayed via the PC 23. Operation for the displayed menus on the cellular telephone 26 or the PC 23 is transported to the license server 29 to perform a procedure for purchasing a license key, if desired. Upon completion of the purchase procedure, the cellular telephone 26 downloads the license key from the license server 29.

Accordingly, the content providing system 21 can obtain a license key, if desired, according to the license key obtaining procedure to decrypt the previously acquired content. The cellular telephone 26 records and maintains the license key together with the corresponding license ID in an internal memory.

Figure 5:
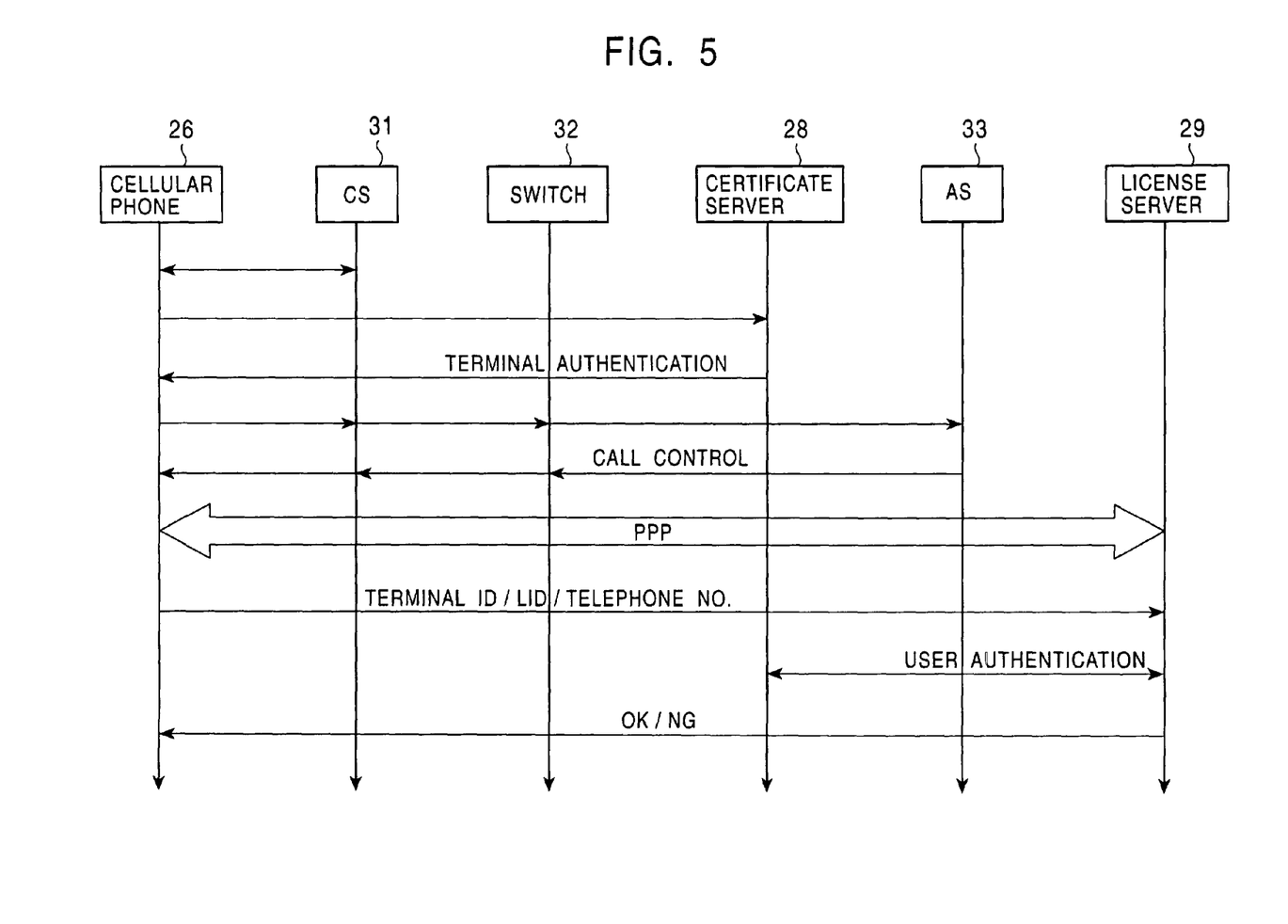
FIG. 5 is a time chart of the procedure shown in FIG. 4 in more detail.

FIG. 5 is a time chart showing a procedure for exchanging data between the cellular telephone 26 and both the certificate server 28 and the license server 29. The process performed in each of the certificate server 28 and the license server 29 is implemented by executing, on a processor such as a CPU (central processing unit), a program stored in a recording medium such as a memory within the each of the certificate server 28 and the license server 29. The process may also be implemented on a hardware circuit.

When the cellular telephone 26 accesses the closest base station (CS) 31, the certificate server 28 is notified by the base station 31 that the cellular telephone 26 has accessed, and the certificate server 28 authenticates the cellular telephone 26 through data exchange therebetween upon the notification. A call is made from the cellular telephone 26 to the base station 31 to a switch 32, thus allowing the cellular telephone 26 to access an access point 33 of the license server 29.

Then, the Point-to-Point Protocol (PPP) is implemented between the cellular telephone 26, so that data can be exchanged via the access point 33 between the cellular telephone 26 and the license server 29. The cellular telephone 26 submits a license ID (LID), a terminal ID, and a telephone number to the license server 29. The terminal ID, and the telephone number are exchanged between the license server 29 and the certificate server 28 to authenticate a user of the cellular telephone 26. When user authentication is successfully performed, the cellular telephone 26 receives the corresponding license key, as described above.

In this way, the certificate server 28 performs user authentication upon a query of a terminal ID and a telephone number from the license server 29, in addition to authentication of the cellular telephone 26 under normal line control, call monitoring associated with the authentication, and telephone call billing, and the like. When accessed by the cellular telephone 26, the license server 29 issues a license key according to the user authentication between the license server 29 and the certificate server 28, or issues a license key by performing the process for purchasing a license key, and charges for such processes.

When the cellular telephone 26 accesses the license server 29, it has been authenticated using the terminal ID and the telephone number in the line connection procedure of the certificate server 28. Thus, user authentication during the line connection procedure may be used again, while omitting user authentication by submitting the terminal ID and the telephone number from the license server 29 to the certificate server 28.

(2) Operation

Accordingly, in the content providing system 21, a variety of content is provided to the PC 23 by downloading the content from the content server 22 or from a recording medium such as an optical disk. If a user desires to use the content, the user is authenticated using a password entered by the user on the cellular telephone 26. The license ID assigned to the content is submitted to the cellular telephone 26 according to the user authentication. If the user is licensed for the content by the license server 29, and if the corresponding license key is maintained on the cellular telephone 26, a content key which is set for the content is decoded using the license key in the cellular telephone 26. The decoded content key is then delivered to the PC 23. In the content providing system 21, therefore, the content is decrypted using the content key, and is presented to the user.

If a user enjoys music on, for example, another party's personal computer, and if the party is not licensed, the user's cellular telephone 26 is connected thereto, thereby making it possible to freely enjoy the content for which he is licensed. In the case where a content key is decoded using a license key to decrypt content using the content key, even if one piece of content is decrypted, the decryption cannot be utilized for other pieces of content, thereby improving security of the overall system.

In the above-described procedure, according to the first embodiment, the authentication capability of the cellular telephone 26 serving as a personal information terminal is effectively used to perform user authentication, thus preventing personal information from being passed to the PC 23, thereby providing content with a sufficient reliability while only requiring a simple structure.

If the corresponding license key is not maintained on the cellular telephone 26 although the user is licensed for the content by the license server 29, on the other hand, in the content providing system 21, the cellular telephone 26 accesses the license server 29 to allow the certificate server 28 which manages the cellular telephone 26 to authenticate the user using the terminal ID and the telephone number of the cellular telephone 26. After user authentication has been performed, the license server 29 determines whether or not the user is licensed. If the user is licensed for the content by the license server 29, a license key corresponding to the license ID submitted by the cellular telephone 26 is provided to the cellular telephone 26. The license key is maintained on the cellular telephone 26.

According to the first embodiment, therefore, the cellular telephone 26 can be used to perform user authentication to use the content, while making effective use of the certificate server 28 which is an existing infrastructure, thereby providing the content with a sufficient reliability while only requiring a simple structure.

If the user is not licensed for the content by the license server 29, the user purchases the content, if desired, and is authorized to use the content. In the content providing system 21, a license key corresponding to the license ID is provided to the cellular telephone 26, and is maintained on the cellular telephone 26.

In the content providing system 21, therefore, a record for licensing is stored in the license server 29 on a cellular telephone basis. If the cellular telephone 26 is replaced with a new one, a user can access the license server 29 again using the new cellular telephone 26, and can obtain the license key again to use the content.

(3) Advantages

As described above, the authentication capability of a cellular telephone as a portable information terminal carried with a user can be effectively used to perform user authentication, thus providing a license key which is data necessary for decrypting content, thereby providing the content with a sufficient reliability while only requiring a simple structure.

The portable terminal is a cellular telephone capable of communicating with a desired party over a telephone line, thus making effective use of the existing infrastructure, such as a server for managing communication, thereby simplifying the overall structure.

Before the license server 29 issues a license key, user authentication is performed by a first step of verifying a password entered by a user of the cellular telephone 26, that is, inherent user authentication, and by a second step of exchanging data between the certificate server 28 and the cellular telephone 26 according to a result of the first authentication step, thereby preventing illegal use of content by a third party.

Second Embodiment

Figure 6:
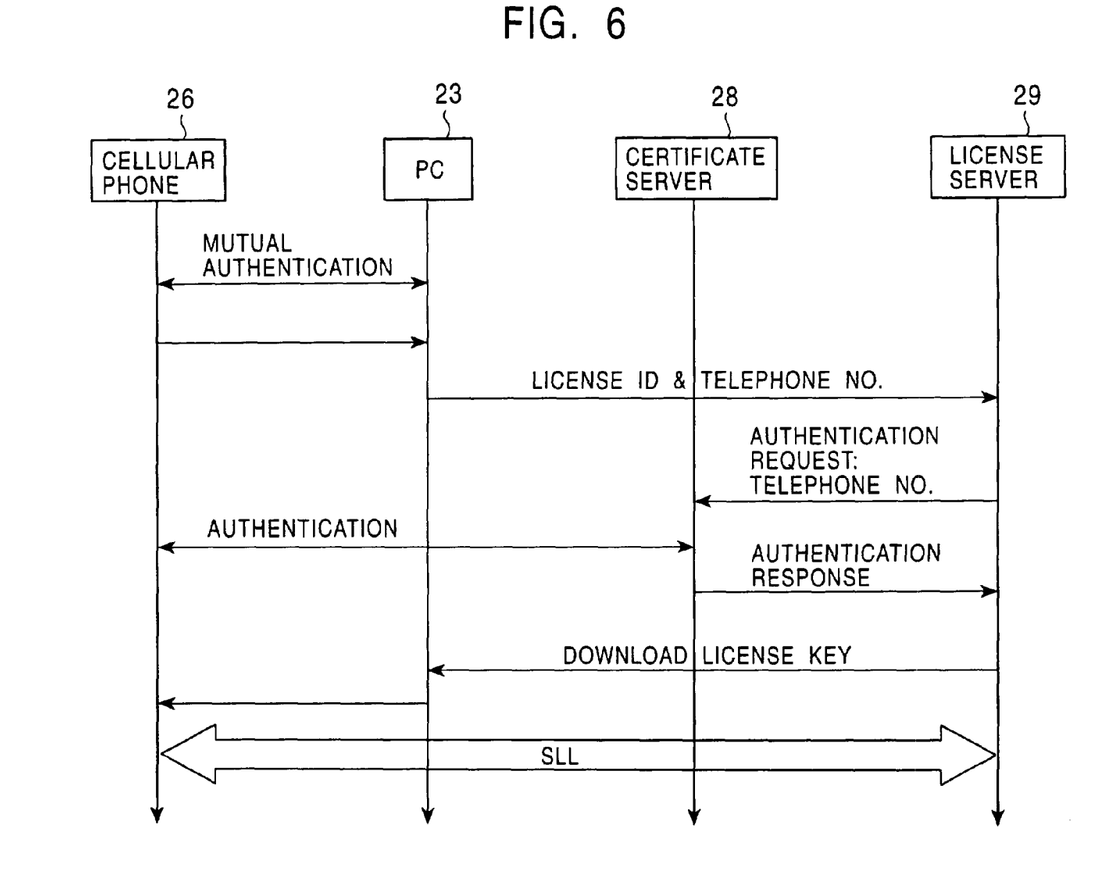
FIG. 6 is a time chart of the procedure in the content providing system according to a second embodiment of the present invention.

In a second embodiment of the present invention, the PC 23 accesses the license server 29. Except that a portion of the procedure in the cellular telephone 26, the PC 23, the certificate server 28, and the license server 29 differs because the PC 23 accesses the license server 29, the structure of the second embodiment is the same as that of the first embodiment. The difference in structure is now focused.

As shown in FIG. 6, as contrasted with FIG. 4, upon a request for the content key from the PC 23, after mutual authentication and user authentication are performed, if the corresponding license key is maintained, the cellular telephone 26 decodes the content key provided by the PC 23, and provides the decoded content key to the PC 23.

If the license key is not maintained, the cellular telephone 26 informs the PC 23 of this, and the PC 23 accesses the license server 29. The PC 23 also submits the telephone number (or terminal ID) obtained by the cellular telephone 26, and the license ID obtained from the content to the license server 29. In response, the license server 29 requests the certificate server 28 for authentication using the telephone number. Then, the certificate server 28 accesses the cellular telephone 26, and uses an authentication protocol in the line control process between the certificate server 28 and the cellular telephone 26 to perform authentication therebetween. The processing result is then sent to the license server 29. The license server 29 issues a license key-according to the result of authentication, or issues a license key after the purchase procedure.

If the case where authentication is performed between the certificate server 28 and the cellular telephone 26 upon a request from the license server 29, a message, for example, "AUTHENTICATION IS BEING PERFORMED", may be displayed on the cellular telephone 26 to inform a user of internal processing of the cellular telephone 26.

If the PC 23 accesses the license server 29, the same advantages are achieved as those in the first embodiment.

Other Embodiments

In the first and second embodiments, a license key is maintained on a cellular telephone; however, the present invention is not limited thereto. A license key may be obtained each time content is played back. Although high security is required to maintain a license key, if a license key is obtained each time content is played back, the safety against stolen cellular telephones can be improved.

While user authentication using a password which is entered on a cellular telephone has been described in the first and second embodiments, the present invention is not limited thereto. For example, biometric, such as fingerprint, authentication may also be used to perform user authentication.

While user authentication is completely performed in a cellular telephone in the first and second embodiments, the present invention is not limited thereto, and data for user authentication may be also sent to a certificate server to perform user authentication, without departing from the scope of the invention. In this case, for example, in order to achieve user authentication using biometric, such as fingerprint, authentication, it may be envisaged that fingerprint data be sent to a certificate server for authentication.

In the first and second embodiments, a license key is obtained on a content basis; however, the present invention is not limited thereto. For example, license keys may also be obtained at a time for a plurality of content, for example, on an album basis. Alternatively, a license key may be set for a plurality of content.

Although a license server is accessed by a cellular telephone according to the procedure thereof in the first embodiment, and a license server is accessed by a personal computer according to the procedure thereof in the second embodiment, the present invention is not limited thereto. The license server may be accessed by the cellular telephone under control of the personal computer in the first embodiment, and, in the second embodiment, conversely, the license server may be accessed by the personal computer under control of the cellular telephone. These controls may also be shared.

In the first and second embodiments, content is played back by a personal computer; however, the present invention is not limited thereto, and any system, such as a vehicle stereo system, may also be used for playback.

Although the authentication capability of a cellular telephone is used in the first and second embodiments, the present invention is not limited thereto, and the authentication capability of a variety of information terminal devices may also be used.

According to the present invention, therefore, the authentication capability of a portable terminal connected to a playback device is used to perform user authentication, thereby providing content with a sufficient reliability while only requiring a simple structure.

What is claimed is:

1. A method of providing information for decrypting a content key, comprising:
   connecting to a portable terminal so as to communicate data to and from a playback device containing content encrypted with the content key;
   authenticating the portable terminal including,
   receiving, at a licensing server from the portable terminal, information for identifying the portable terminal and a license ID for identifying the encrypted content, and
   determining at the licensing server, based on the information and the license ID received, whether or not the encrypted content should be decrypted by the playback device;
   authenticating a user of the portable terminal without communicating information regarding the user to the playback device; and
   transmitting decryption information, including a license key, to the portable terminal when it is determined by the license server that the encrypted content should be decrypted by the portable terminal, the decryption information for decrypting an encrypted form of the content key so that the content key is decrypted in the portable terminal with the license key stored by the portable terminal and identified by the license ID, the license ID identifying the license key corresponding to specific content to be decrypted at the playback device by the decrypted content key;
   wherein the decrypted content key is sent to the playback device to decrypt the specific content of the playback device corresponding to the license ID.

2. A method according to claim 1, wherein said authenticating the portable terminal includes authenticating the portable terminal over a telephone line.

3. A method according to claim 1, wherein said authenticating the portable terminal includes authenticating the portable terminal wirelessly.

4. A method according to claim 1, further comprising:
   purchasing the license key when it is determined in said authenticating the portable terminal step that the portable terminal is not licensed.

5. A system for providing information for decrypting a content key, comprising:
   a playback device;
   means for connecting to a portable terminal so as to communicate data to and from the playback device containing content encrypted with the content key, the portable terminal including means for authenticating a user without communicating information regarding the user to the playback device;
   means for authenticating the portable terminal including, means for receiving, at a licensing server from the portable terminal, information for identifying the portable terminal and a license ID for identifying the encrypted content, and
   means for determining at the licensing server, based on the information and the license ID received, whether or not the encrypted content should be decrypted by the playback device; and means for transmitting decryption information, including a license key, to the portable terminal when it is determined by the license server that the encrypted content should be decrypted by the portable terminal, the decryption information for decrypting an encrypted form of the content key so that the content key is decrypted in the portable terminal with the license key stored by the portable terminal and identified by the license ID, the license ID identifying the license key corresponding to specific content to be decrypted at the playback device by the decrypted content key;
   wherein the decrypted content key is sent to the playback device to decrypt the specific content of the playback device corresponding to the license ID.

6. A non-transitory computer readable storage medium including stored program instructions that cause a computer to implement a method of causing an information processing system to provide information for a decrypting content key, said method comprising:

connecting to a portable terminal so as to communicate data to and from a playback device containing content encrypted with the content key;

authenticating the portable terminal including, receiving, at a licensing server from the portable terminal, information for identifying the portable terminal and a license ID for identifying the encrypted content, and determining at the licensing server, based on the information and the license ID received, whether or not the encrypted content should be decrypted by the play back device; authenticating a user of the portable terminal without communicating information regarding the user to the playback device; and transmitting decryption information, including a license key, to the portable terminal when it is determined by the license server that the encrypted content should be decrypted by the portable terminal, the decryption information for decrypting an encrypted form of the content key so that the content key is decrypted in the portable terminal with the license key stored by the portable terminal and identified by the license ID, the license ID identifying the license key corresponding to specific content to be decrypted at the playback device by the decrypted content key;

wherein the decrypted content key is sent to the playback device to decrypt the specific content of the playback device corresponding to the license ID.

7. A method of providing information for decrypting content, comprising:

connecting to a playback device containing content encrypted with a content key;

authenticating the playback device;

receiving, from the playback device, a license ID for identifying specific content to be decrypted;

connecting to a providing device independent of the playback device using the ID of the providing device for retrieving a license key from a license server corresponding to the license ID for decrypting an encrypted form of the content key;

authenticating the providing device;

authenticating a user of the providing device without communicating information regarding the user to the playback device;

receiving, from the providing device, a license key stored by the providing device and identified by the license ID corresponding to specific content to be decrypted at the playback device by the decrypted content key for decrypting the content key according to the result of authentication of the providing device, and decrypting the encrypted form of the content key in the providing device;

providing the decrypted content key to the playback device for decrypting the specific content corresponding to the license ID.

8. A method according to claim 7, wherein said authenticating the user step includes authenticating the user according to a user input directly to the providing device.

9. A method according to claim 8, wherein said user authentication includes authenticating the user according to a password input from the user.

10. A system for providing information for decrypting content, comprising:

a playback device;

means for connecting to the playback device containing content encrypted with a content key and to a providing device, independent from the playback device, for providing information for decrypting the content;

means for authenticating the playback device, and for authenticating the providing device;

means for authenticating a user of the providing device without communicating information regarding the user to the playback device;

means for downloading from a license server to the providing device a license key corresponding to a license ID identifying specific content to be decrypted;

means for receiving, from the playback device, the license ID, for identifying the license key stored within the providing device for decrypting the encrypted content key, the providing apparatus delivering the decrypted form of the content key to the playback device.

11. A non-transitory computer readable storage medium including stored program instructions that cause a computer to implement a method of causing a portable terminal to provide information for decrypting content, said method comprising:

connecting to a playback device containing content encrypted with a content key;

authenticating the playback device;

receiving, from the playback device, a license ID for identifying specific content to be decrypted;

connecting to a providing device independent of the playback device using the ID of the providing device for retrieving a license key from a license server corresponding to the license ID for decrypting an encrypted form of the content key;

authenticating the providing device;

authenticating a user of the providing device without communicating information regarding the user to the playback device;

receiving, from the providing device, a license key stored by the providing device and identified by the license ID corresponding to specific content to be decrypted at the playback device by the decrypted content key for decrypting the content key according to the result of authentication of the providing device, and decrypting the encrypted form of the content key in the providing device;

providing the decrypted content key to the playback device for decrypting the specific content corresponding to the license ID.

12. A method of providing information for decrypting content, comprising:

connecting to a playback device containing content encrypted with a content key;

authenticating a user of a portable terminal without communicating information regarding the user to the playback device, the authentication completely performed at the portable terminal;

receiving, from the playback device, a license ID for identifying specific content to be decrypted;

determining whether or not a license key corresponding to the license ID for decrypting an encrypted form of the content key is stored in a the portable terminal according to the license ID;

providing, when the license key for decrypting the encrypted form of the content key is stored in a portable terminal, the decrypted form of the content key to the playback device by decrypting the encrypted form of the content key with the identified license key;

connecting to a providing device for providing the license key for decrypting the encrypted form of the content key when the information for decrypting the content key is not stored in the portable terminal;

receiving, from the providing device, the license key corresponding to the license 1D for decrypting the encrypted form of the content key used to encrypt the specific content in the playback device corresponding to the license ID, and decrypting the content key in the portable terminal; and providing the decrypted content key to the playback device for decrypting the specific content corresponding to the license ID.

13. An apparatus for providing information for decrypting content, comprising:

a playback device;

means for connecting to the playback device containing content encrypted with a content key and to a providing device for providing information for decrypting the content;

means for authenticating a user of a portable terminal without communicating information regarding the user to the playback device, the authentication completely performed at the portable terminal; and means for receiving, from the playback device, a license ID for identifying specific content to be decrypted; for determining whether or not a license key corresponding to the license ID for decrypting an encrypted form of the content key is stored in the portable terminal according to the license ID; for, when the license key for decrypting the encrypted form of the content key is stored in a portable terminal, the decrypted form of the content key to the playback device by decrypting the encrypted form of the content key with the identified license key; for, when the information necessary for decrypting the content key is not self-contained, receiving, from the providing device, information necessary for decrypting the content key used to encrypt the content in the playback device and decrypting the content key in the portable terminal; and for providing the decrypted content key to the playback device for decrypting the content.

14. A non-transitory computer readable storage medium including stored program instructions that cause a computer to implement a method of causing a portable terminal to provide information for decrypting content, said method comprising:

communicating with a playback device containing content encrypted with a content key;

authenticating a user of a portable terminal without communicating information regarding the user to the playback device, the authentication completely performed at the portable terminal;

receiving, from the playback device, a license ID for identifying specific content to be decrypted;

determining whether or not a license key corresponding to the license ID for decrypting an encrypted form of the content key is stored in the portable terminal according to the license ID;

providing, when the license key for decrypting the encrypted form of the content key is stored in a portable terminal, the decrypted form of the content key to the playback device by decrypting the encrypted form of the content key with the identified license key;

communicating with a providing device for providing the license key for decrypting the encrypted form of the content key when the information for decrypting the content key is not stored in the portable terminal;

receiving, from the providing device, information necessary for decrypting the encrypted form of the content key used to encrypt the content in the playback device, and decrypting the content key in the portable terminal; and providing the decrypted content key to the playback device for decrypting the content.

15. A method of providing information for decrypting content, comprising:

connecting to a playback device containing content encrypted with a content key so as to communicate data to and from a user's portable terminal;

obtaining, with a license server from the playback device, information identifying the portable terminal and a license ID identifying the encrypted content;

communicating a license key corresponding to the encrypted content from the license server to the portable terminal using the information identifying the portable terminal and the license ID;

authenticating the portable terminal;

authenticating a user of the portable terminal without communicating information regarding the user to the playback device; and decrypting the content key in the portable terminal with the license key stored by the portable terminal, the license ID identifying the license key corresponding to specific content to be decrypted at the playback device by the decrypted content key;

wherein the content key decrypted is sent to the playback device to decrypt the specific content of the playback device corresponding to the license ID.

16. A system for providing information for decrypting content, comprising:

a playback device;

means for connecting to a user's portable terminal and to the playback device containing content encrypted with a content key so as to communicate data to and from the portable terminal;

means for authenticating the portable terminal;

means for authenticating a user of the portable terminal without communicating information regarding the user to the playback device;

means for downloading from a license server to the portable terminal a license key corresponding to a license ID identifying specific content to be decrypted; and means for obtaining, from the playback device, information for identifying the portable terminal; for accessing the portable terminal according to the information for identifying the portable terminal; and for providing information necessary, for decrypting an encrypted form of the key to the portable terminal according to the result of authentication, so that the content key is decrypted in the portable terminal with the license key stored by the portable terminal and identified by the license ID, the license ID identifying the license key corresponding to specific content to be decrypted at the playback device by the decrypted content key.

17. A non-transitory computer readable storage medium including stored program instructions that cause a computer to implement a method of causing an information processing system to provide information for decrypting content, said method comprising:

connecting to a playback device containing content encrypted with a content key so as to communicate data to and from a user's portable terminal;

obtaining, with a license server from the playback device, information identifying the portable terminal and a license ID identifying the encrypted content;

communicating a license key corresponding to the encrypted content from the license server to the portable terminal using the information identifying the portable terminal and the license ID;

authenticating the portable terminal;

authenticating a user of the portable terminal without communicating information regarding the user to the playback device; and decrypting the content key in the portable terminal with the license key stored by the portable terminal, the license ID identifying the license key corresponding to specific content to be decrypted at the playback device by the decrypted content key;

wherein the content key decrypted is sent to the playback device to decrypt the specific content of the playback device corresponding to the license ID.

18. A method of using a portable terminal to provide information for decrypting content, comprising:

communicating with a playback device containing content encrypted with a content key;

sending information for identifying the portable terminal to the playback device;

communicating with a licensing server via the portable terminal for retrieving a license key for decrypting an encrypted form of the content key, communicating with the licensing server according to the information for identifying the portable terminal which is sent to the playback device;

authenticating the portable terminal;

authenticating a user of the portable terminal without communicating information regarding the user to the playback device;

receiving, from the licensing server a license key corresponding to a license ID provided by the playback device, for decrypting the content key according to the result of said authentication, and decrypting the content key at the portable terminal; and providing the decrypted content key to the playback device for decrypting the specific content identified by the license ID.

19. An apparatus for providing information for decrypting content, comprising:

an interface configured to communicate with a playback device containing content encrypted with a content key, and configured to communicate with a licensing server for providing information for decrypting the content;

an authentication unit configured to authenticate the apparatus;

an input unit configured to receive authentication information to authenticate a user of the apparatus; and a communication unit configured to send information identifying the apparatus to the playback device without communicating information regarding a user of the apparatus; configured to communicate with licensing server device according to the information for identifying the apparatus which is sent to the playback device; configured to receive, from the licensing server a license key corresponding to a license ID provided by the playback device for decrypting an encrypted form of the content key according to the result of authentication, and decrypting the content key in the apparatus; and configured to provide the decrypting content key to the playback device for decrypting the specific content identified by the license ID.

20. A non-transitory computer readable storage medium including stored program instructions that cause a computer to implement a method of causing an information processing system to provide information for decrypting content, said method comprising:

communicating with a playback device containing content encrypted with a content key;

sending information for identifying the portable terminal to the playback device;

communicating to a licensing server via the portable terminal for retrieving a license key for decrypting an encrypted form of the content key, connecting to the licensing server according to the information for identifying the portable terminal which is sent to the playback device;

authenticating the portable terminal;

authenticating a user of the portable terminal without communicating information regarding the user to the playback device;

receiving, from the licensing server a license key corresponding to a license ID provided by the playback device, for decrypting the content key according to the result of said authentication and decrypting the content key at the portable terminal; and providing the decrypted content key to the playback device for decrypting the specific content identified by the license ID.

* * * * *